Oct. 11, 1932. J. E. LOVELY 1,881,762
LATHE HAVING DOUBLE END DRIVE
Filed April 16, 1930 5 Sheets-Sheet 1
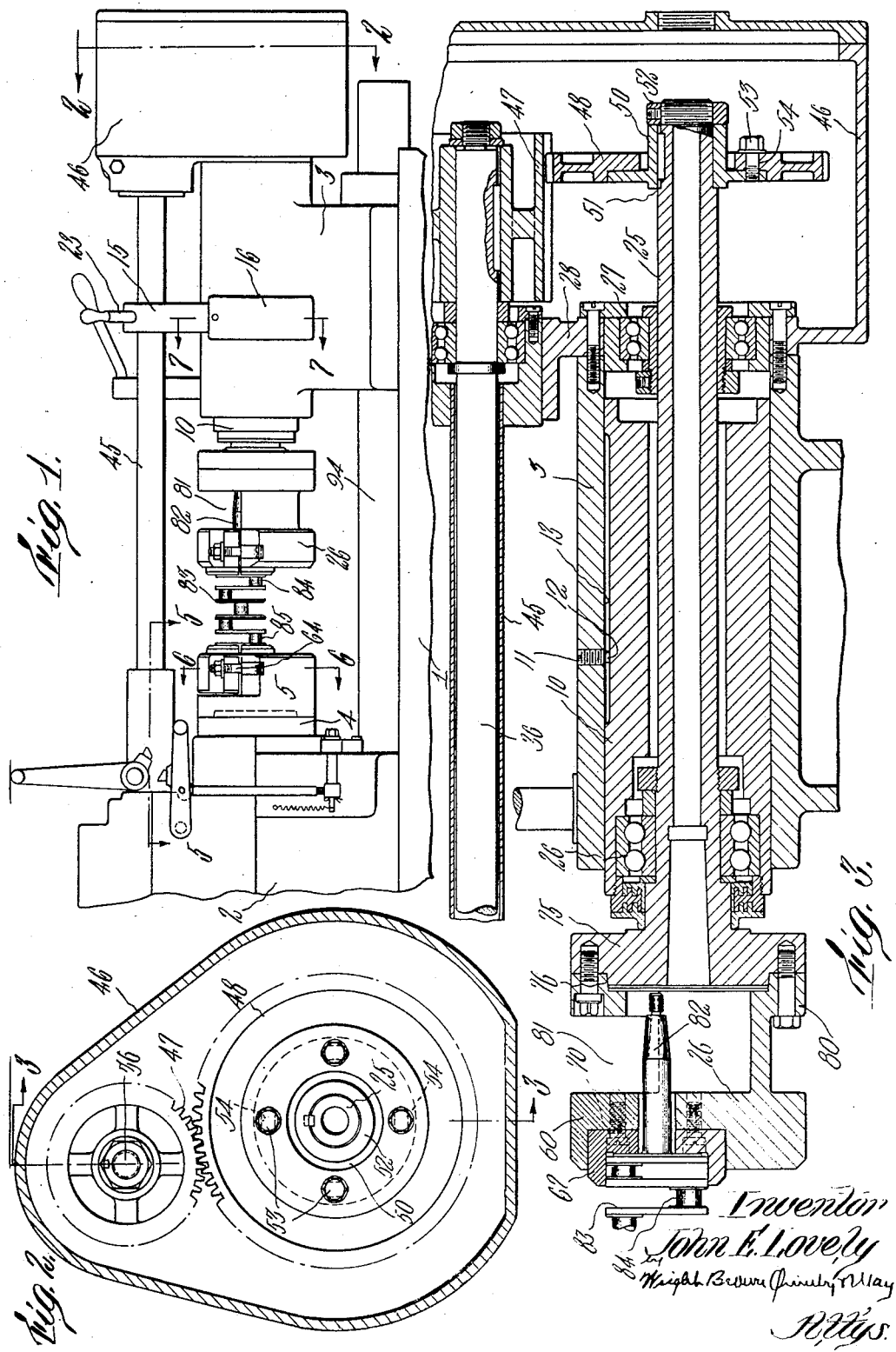

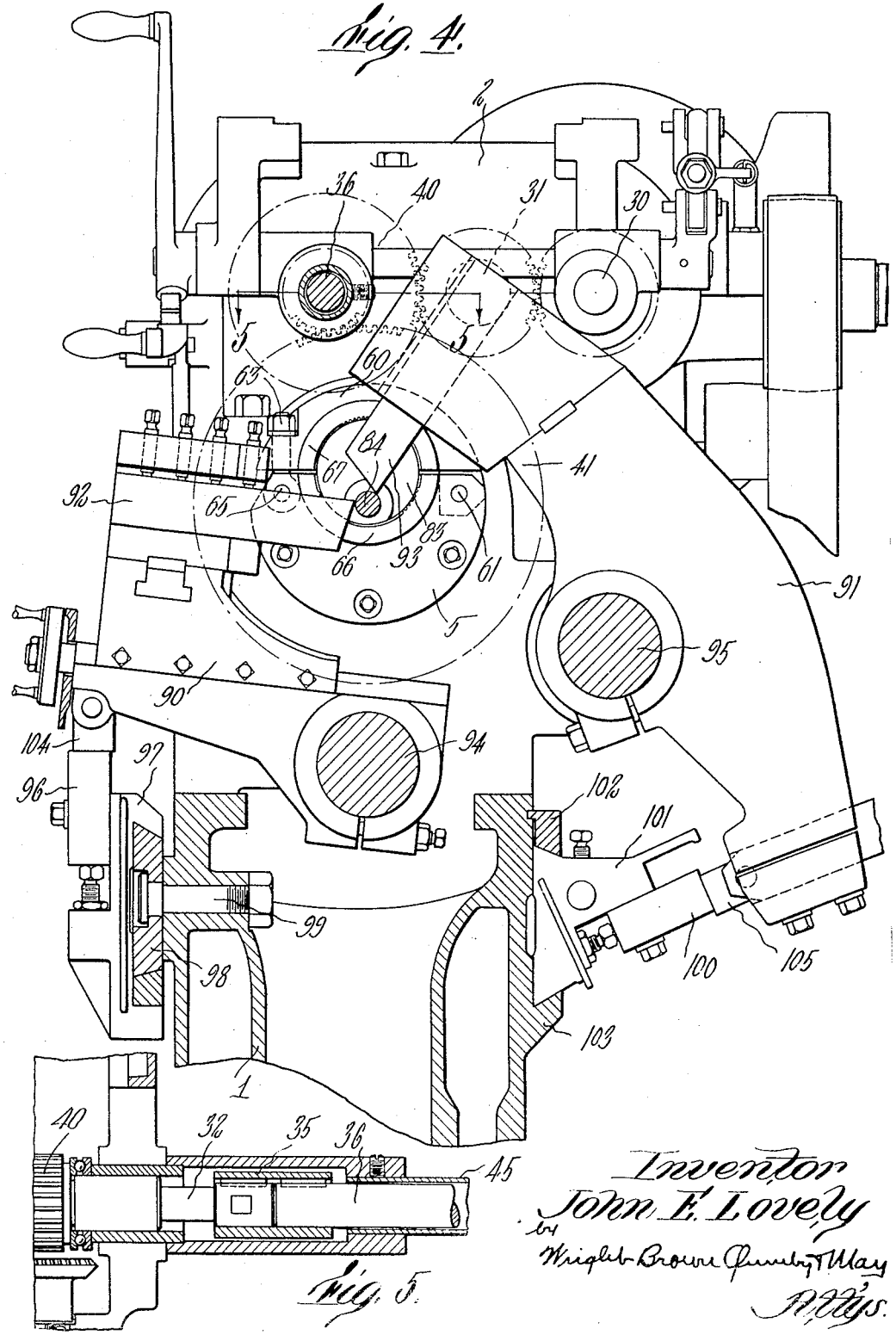

Oct. 11, 1932.   J. E. LOVELY   1,881,762
LATHE HAVING DOUBLE END DRIVE
Filed April 16, 1930   5 Sheets-Sheet 3
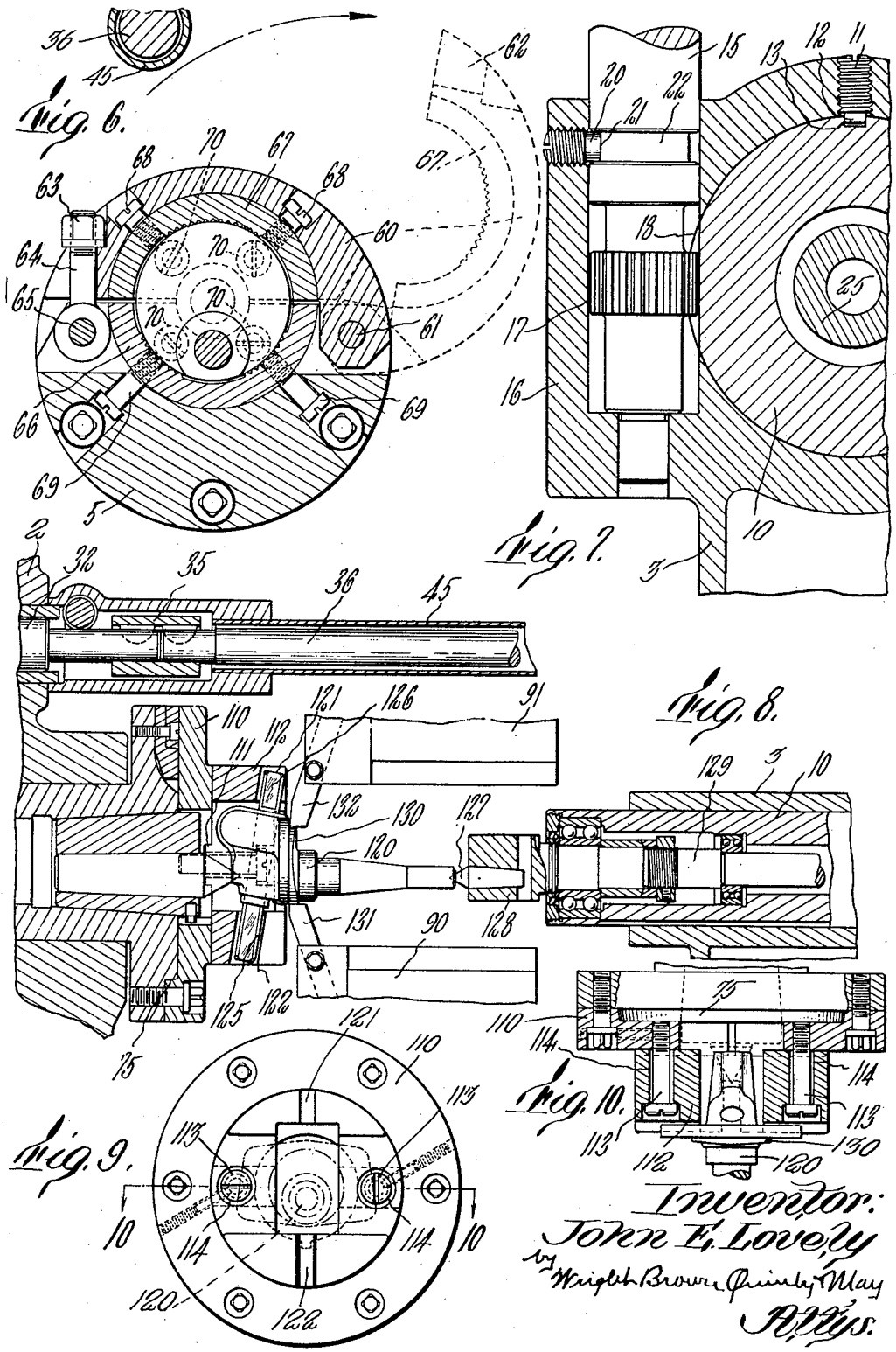

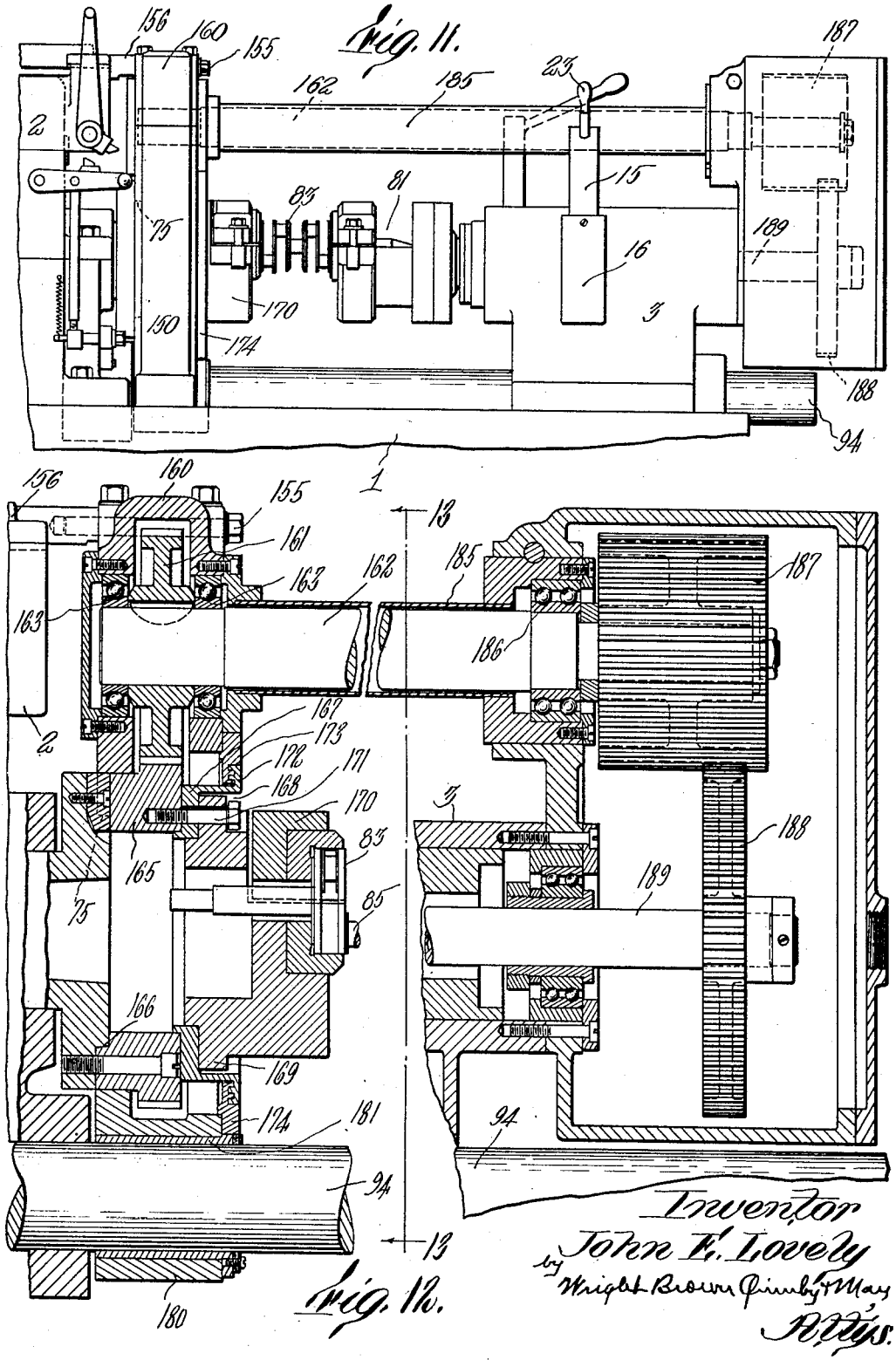

Patented Oct. 11, 1932

1,881,762

UNITED STATES PATENT OFFICE

JOHN E. LOVELY, OF SPRINGFIELD, VERMONT, ASSIGNOR TO JONES & LAMSON MACHINE COMPANY, OF SPRINGFIELD, VERMONT, A CORPORATION OF VERMONT

LATHE HAVING DOUBLE END DRIVE

Application filed April 16, 1930. Serial No. 444,740.

For certain classes of work as where machining operations are to be effected by a lathe at some distance from the headstock spindle by which the work is rotated, and particularly where portions of the work between its driving connection to the headstock spindle and where machining is to be effected are not direct and sturdy, it is desirable to drive the work from the tailstock as well as from the headstock so as to more evenly distribute the stresses in the work while the machining is being effected. A multiple cylinder engine crank shaft whose intermediate bearings or crank pin portions are to be machined is one example of such work.

This invention, therefore, relates to a lathe construction by which such double end driving may be effected in a simple and effective manner, and while not restricted thereto is of especial applicability to lathes of the well known Fay type wherein a plurality of tool carriers are employed each, mounted on a rockable and axially movable shaft, the positions of these two carriers being controlled automatically as by cams.

For a more complete understanding of this invention, reference may be had to the accompanying drawings in which Figure 1 is a fragmentary front elevation of a lathe embodying the subject matter of this invention.

Figure 2 is a section on line 2—2 of Figure 1.

Figure 3 is a section on line 3—3 of Figure 2.

Figure 4 is a fragmentary transverse section through the lathe adjacent to the tool carriers and looking toward the head stock.

Figure 5 is a detail section on line 5—5 of Figures 1 and 4.

Figure 13:
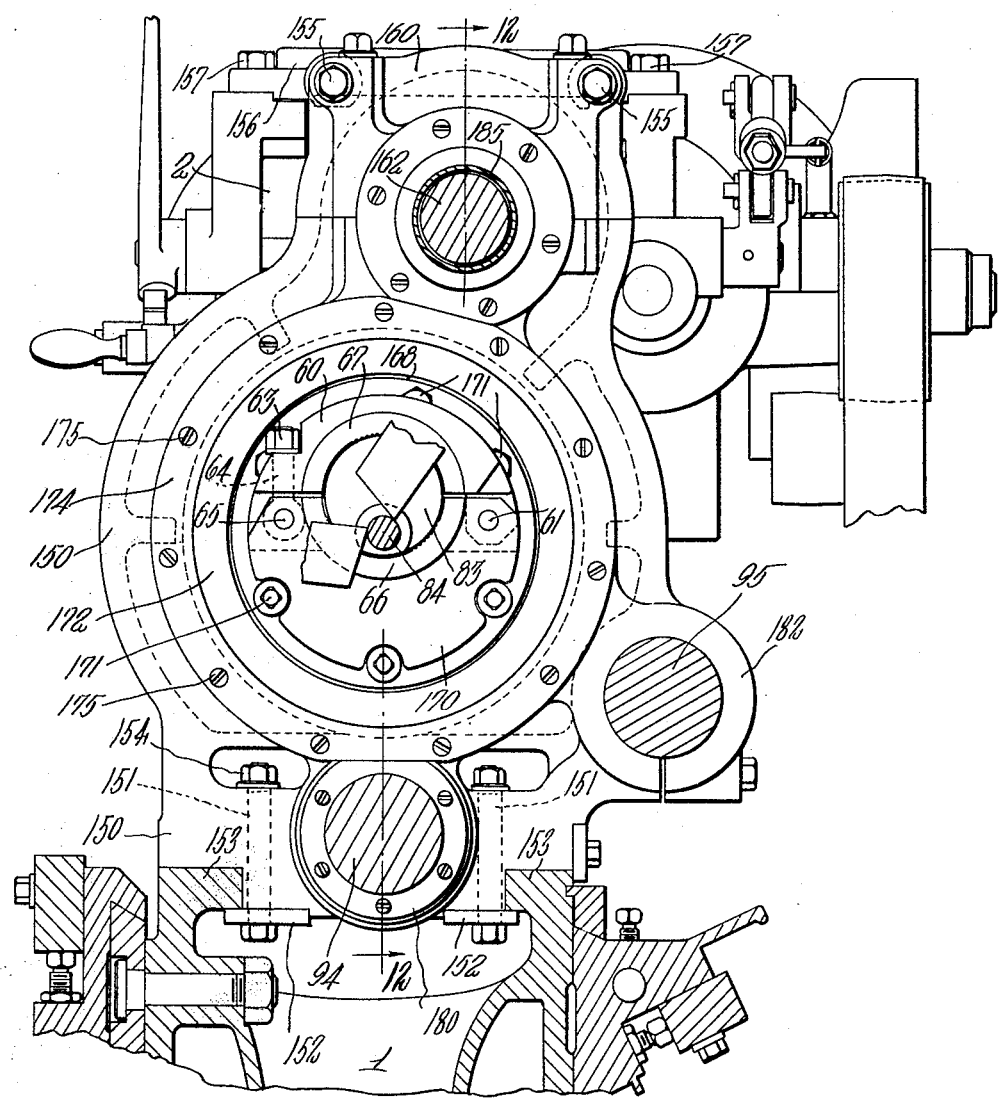

Figures 6 and 7 are detail sections on lines 6—6 and 7—7, respectively, of Figure 1.

Figure 8 is a fragmentary section taken substantially as in Figure 3, but showing the driving end of the tailstock driving mechanism and showing a different type of work being machined.

Figure 9 is an end elevation of the headstock work driving fixture, the position of the work being shown in dotted lines.

Figure 10 is a section on line 10—10 of Figure 9.

Figure 11 is a fragmentary front elevation of a lathe in which the subject matter of the present invention is applied as an attachment.

Figure 12 is a longitudinal section on line 12—12 of Figure 13.

Figure 13 is a section on line 13—13 of Figure 12, but showing the positions of certain operating tools.

Referring first to the construction illustrated in Figures 1 to 7 inclusive, at 1 is shown a portion of a lathe bed carrying a headstock 2 and a tailstock 3. The headstock carries the usual rotary work spindle 4 on which is supported a work holder as at 5. As shown best in Figure 3, the tailstock 3 has mounted for axial movement therein a sleeve 10 keyed against rotation as by means of a screw 11 (see Figure 7), having its inner end 12 riding in a key slot 13 in the sleeve 10. This sleeve may be adjusted axially in the tailstock as by rotation of a vertical shaft 15 journaled in a lateral extension 16 of the tailstock and having in this extension a pinion portion 17 meshing with rack teeth 18 cut in one side portion of the sleeve 10. This shaft 15 is held against axial motion as by means of a threaded plug 20, the inner end 21 of which engages in an annular groove 22 in the shaft. At the upper end of this shaft is shown a handle 23 by which it may be rotated, thus to adjust the longitudinal position of the sleeve 10. At 25 is shown a tailstock spindle journaled at one end as at 260 in the sleeve 10 and adjacent to its other end in a bearing 27 fixed to a portion of the tailstock casing 28. The forward end of this spindle 25 is provided with a work holder 26. The head and tailstock spindles 4 and 25 are shown as arranged in axial alinement.

As shown best in Figure 4, the headstock 2 has positioned longitudinally therein two shafts 30 and 31. The shaft 30 is a drive shaft for the headstock spindle and may be driven by any suitable means such as a motor (not shown) which may be supported on top of the headstock 2. The shaft 31 is driven from the shaft 30 and the shaft 31 is also arranged to drive a shaft 32, the end portion of which is shown in Figures 5 and 8 and to which is coupled in axial alinement by a coupling 35 a shaft 36, which is shown also in Figures 2, 3 and 4. The shaft 32 carries a gear 40 thereon which meshes with a gear 41 fixed to the headstock spindle. The provision of the intermediate shafts 31 and 32 between the shaft 30 and the headstock spindle permits the use of change gears and multiple speed transmission devices in the headstock by which the speed of rotation of the headstock spindle may be adjusted or changed as desired and as is usual with this type of lathe. The shaft 32, however, is geared to the headstock spindle in a definite and unchanging ratio so that the shaft 36, which is coupled to the shaft 32, is driven at a definite rate relative thereto.

As shown best in Figure 3, the shaft 36 extends through a suitable encasing tube 45 into a gear casing 46 at the rear end of the tailstock and within this casing it has fixed thereto a long gear 47 which meshes with a gear 48 carried by the tailstock spindle 25. The gear 47 is sufficiently long so that the gear 48 remains in mesh therewith throughout the range of axial positions of the tailstock spindle due to axial adjustment of its carrying sleeve 10. As shown in Figures 2 and 3 this gear 48 is formed as a ring which may be angularly adjustably secured as by bolts 53 passing through elongated slots 54 in the gear 48, and threaded into a flanged collar 50 keyed to the spindle 25 and held in position thereon against a shoulder 51 by means of a threaded collar 52. The intermeshing gears 47 and 48 are the same size as the intermeshing gears 40 and 41 so that the tailstock spindle is driven at the same rate as the headstock spindle.

Each of the work holders 5 and 26 is provided with a socket portion at its outer end to receive the work, this socket portion having been formed on one side by an element 60 hinged thereto at 61 (see Figure 6) and having a slotted free end as at 62 to receive a nut 63 on a locking bolt 64 pivoted at 65 to the other portion of the carrier by which the socket members may be clamped against the work under pressure. In order that work of different sizes may be readily engaged, it is preferable that the socket be formed somewhat larger than the work to be held and that it be lined with removable sleeve members 66 and 67. The sleeve member 67 is shown as secured as by screws 68 to the pivoted section 60 and the sleeve section 66 is secured as by similar screws 69 to the other portion of the holder. These sleeve members 66 and 67 are also shown as provided with segmental rear end faces which may be secured to the bases of the socket parts as by the screws 70. Each of the rotary spindles may be provided at its outer end with a nose as shown at 75 in Figure 3, provided with a boss 76 having a tapered periphery for engagement with a mating tapered seat at the rear end of each of the work holders. The work holder 26, as shown, differs from the work holder 5 in that its socket portion which holds the work is spaced from a portion 80 which engages the spindle nose 75 to form a recess as at 81 to receive an extended end portion 82 of the crank shaft 83 which is the work to be turned. This permits the holder to engage the crank portion of the work where it may have a good bearing thereon and permits the driving torque to be applied to the work nearer to the point at which machining is to be effected. As shown in Figures 1 and 3 the crank pin portions 84 and 85 are thus brought into axial alinement with the work spindles, the sockets in the work holders being eccentric thereto. These crank pin portions 84 and 85 are therefore in position to be turned. The opposite end of the crank shaft 83 has no extension similar to the extension 82 and therefore the work holder 5 does not require the recess 81.

The tool carriers 90 and 91 shown in Figure 4 are provided with tools 92 and 93, respectively, for operating on the crank pin portions 84 and 85. The tool carrier 90 is fixed to a rockable and axially movable tool bar 94 which is positioned beneath the work and parallel to the shaft 36. The tool carrier 91 is fixed to the back tool bar 95, which is also rockable and axially movable, and is arranged parallel to the bar 94. The angular position of the tool bar 94 is shown as controlled by a former cam 96 mounted on a slide 97 movable on a guideway 98 pivoted as at 99 to the front wall of the bed 1. The rear tool bar 95 has its axial position controlled by a former cam 100 supported by a cam carrier 101 slidably mounted in guideways 102, 103 on the rear face of the bed 1. The former cam carriers may be moved axially to determine the point of engagement between the former cams and the former cam followers 104 and 105, respectively, by cams (not shown), as is usual with Fay lathes and the tool bars 94 and 95 may be controlled in their axial positions by other cam means in the usual well known manner.

In Figures 7 to 10 this double end drive is shown as applied to the machining of steering knuckles for automobiles. The headstock spindle 4 provided with the spindle nose 75 has fixed to this nose for rotation therewith a member 110 which has a groove 111 formed laterally across the axis of the headstock spindle to slidably support a block 112 which is secured to the member 110 for limited floating sliding motion by screws 113 passed through enlarged openings 114 in the block 112 and threaded into the member 110. The block 112 is provided with a socket to receive one end portion of the knuckle 120 and is also provided with transverse grooves 121 and 122 in its outer face to receive a bar 125 extending through the king pin opening of the knuckle 120, thus to effect driving engagement between the block 112 and the knuckle through the engagement of the sides of the slot with the flattened faces 126 of the bar 125. The opposite end of the knuckle is shown as carried by a dead center 127 mounted eccentrically in a holding block 128 at the outer end of the tailstock spindle 129. This spindle 129 is journaled in the axially adjustable sleeve 10 in the tailstock in the same manner as the spindle 25 shown in Figure 3. The steering knuckle is thus held eccentric to the work spindles in position to turn the eccentric shoulder 130 thereon by the tools 131 and 132 carried by the front and rear tool carriers 90 and 91, respectively.

In place of building the tailstock spindle driving mechanism into the machine, it may be applied as an attachment to the usual Fay lathe, as is illustrated in Figures 11 to 13. Referring to these figures, at 150 is shown a frame member supported on the bed 1 and made fast thereto in any suitable manner, for example, as by studs 151, 151 shown in Figure 13 as passing through blocks 152 at their lower ends which partly underlie top flanges 153 of the bed 1, and which have nuts 154 on their upper ends. This frame member 150 fits up against the forward face of the headstock and as shown its upper end may be fixed as by bolts 155 to a cap plate 156 which may be bolted to the casing of the headstock 2 as by the bolts 157. This frame portion 150 has a gear housing 160 within which is positioned a gear 161 keyed to the end of a shaft 162 which is journaled at 163 in the housing. This gear meshes with a ring gear 165 having its rear face formed with a tapered socket 166 to fit the nose 75 of the headstock spindle. The forward face of the gear ring 165 has fixed thereto the inner face portion of a sealing ring 167, the outer face of which has a recess at 168 to receive the inner flanged end 169 of a work holder 170 of a type suitable for the work to be machined and herein shown as of the general type shown in Figure 1 at 5 where it is desired to machine crank shafts. The work holder and the guard ring 167 are shown as fixed to the gear 165 as by means of bolts 171. The outer face of the guard ring 167 is outwardy turned to form a flange 172 having a series of inwardly or rearwardly directed annular ridges 173 which interfit with similar ridges on a ring member 174 fixed as by screws 175 (see Figure 13) to the outer face of the frame 150. The provision of the sealing ring prevents the cutting lubricant and foreign matter such as chips or the like from finding their way back of the work holder to the bearing parts of the mechanism.

The frame 150, as shown, is also provided with bearing portions as at 180 and 182 to receive the tool bars 94 and 95. The tool bar 94, as shown in Figure 12, passes through a bearing sleeve 181 in the bearing 180. The shaft 162 is thus rotated by rotation of the headstock spindle. It extends through a shielding tube 185 to the tailstock of the machine in which it is journaled as at 186, and on the end of this shaft 162 is fixed a long gear 187 which meshes with the gear 188 on the tailstock spindle 189, which is mounted for axial movement in the tailstock in the same manner as heretofore described with relation to the tailstock spindles 25 and 129. In this form of the invention, however, it will be seen that the tailstock spindle drive is taken from the headstock spindle through a mechanism which is detachably secured to the headstock end of the machine.

Certain embodiments of this invention having thus been described, it should be evident to those skilled in the art that various changes and modifications might be made therein without departing from the spirit or scope of this invention as defined by the appended claims.

I claim:

1. In combination, a bed, head and tailstocks carried by said bed, a rotary work spindle in each of said stocks, a sleeve in which said tailstock spindle is journaled, means for adjusting said sleeve axially in said tailstock toward and from said headstock, work holders carried by said spindles for supporting work therebetween, means for rotating said headstock spindle, and rotary connections for said tailstock spindle including a rotary shaft extending between said stocks and in driven relation to said rotating means, a long gear fixed to said shaft at said tailstock, and a gear carried by said tailstock spindle meshing with said long gear throughout the range of adjustment of said sleeve.

2. A machine of the class described comprising a bed, a headstock fixed to said bed, a tailstock, a work spindle in each stock, said spindles being in axial alinement and relatively adjustable toward and from each other, means for fixing work to the adjacent ends of said spindles, means for rotating said headstock spindle, a shaft extending between said stocks, operative connections between said shaft and rotating means, connections from said shaft for rotating said tailstock spindle, a tool bar mounted for rocking and axial movement parallel to said shaft, a tool carrier fixed to said bar, and means for controlling the angular and axial positions of said bar.

3. A machine of the class described comprising a bed, head and tailstocks carried by said bed, a rotary work spindle in each stock, means for fixing opposite end portions of work to the adjacent ends of said spindles, means including a shaft extending between said stocks for simultaneously rotating said spindles, a plurality of rockable and axially movable cam controlled tool bars extending between said head and tailstocks, and tool carriers fixed to said bars for carrying tools in position to operate on work fixed to said spindles.

4. A machine of the class described comprising a bed, head and tailstocks carried by said bed, a rotary spindle in each of said stocks for rotatably carrying opposite end portions of work, a pair of cam controlled parallel rockable and axially movable tool bars, one of said bars being positioned beneath the work, a tool carrier fixed to each bar and for carrying a tool for operating on the work held by said spindles, means for rotating one of said spindles, and means including a shaft extending between said head and tailstocks above the work and between said tool carriers for transmitting rotation to the other of said spindles.

5. A machine of the class described comprising a bed, head and tailstocks carried by said bed, a rotary work spindle carried by each of said stocks in axial alinement, said headstock having a casing, a detachable housing carried by said casing, a shaft journalled in said housing and extending to said tailstock, intermeshing gears on said headstock spindle and said shaft, said shaft gear being located in said housing, and intermeshing gears on said shaft and tailstock spindle.

6. A machine of the class described comprising a bed, head and tailstocks carried by said bed, a rotary work spindle carried by each of said stocks, a nose member carried by said headstock spindle, a gear formed to engage said nose member coaxially with said headstock spindle and fixed to said member, a work holder fixed to said gear, a work holder carried by said tailstock spindle, said headstock having a casing, a housing detachably secured to said casing, a shaft journaled in said housing and extending to said tailstock, a gear in said housing fixed to said shaft and meshing with said headstock spindle gear, and intermeshing gears on said shaft and said tailstock spindle.

7. A machine of the class described comprising a bed, head and tailstocks carried by said bed, a rotary work spindle carried by each of said stocks, a nose member carried by said headstock spindle, a gear formed to engage said nose member coaxially with said headstock spindle and fixed to said member, a work holder fixed to said gear, a work holder carried by said tailstock spindle, cam controlled rockable and axially movable tool bars, a tool carrier fixed to each bar for carrying tools to operate on work carried by said holders, said headstock having a casing, a housing detachably secured to said casing and through which said bars pass, a shaft journaled in said housing and extending to said tailstock, a gear in said housing fixed to said shaft and meshing with said headstock spindle gear, and intermeshing gears on said shaft and said tailstock spindle.

8. A holder for a steering knuckle, which comprises a member attachable to the end of a rotary spindle, a block carried by said member for limited floating movement in one diametrical direction across the axis of said spindle, said block having a recess to receive one end of said knuckle and having a slot laterally of said axis and at right angles to said diametrical direction, and a pin extending through the king pin opening of said knuckle and engaging with said slot and serving through its engagement with the side walls of said slot and said knuckle to transmit rotation from said spindle to said knuckle.

In testimony whereof I have affixed my signature.

JOHN E. LOVELY.